United States Patent
Saikalis et al.

(10) Patent No.: US 6,453,739 B1
(45) Date of Patent: Sep. 24, 2002

(54) TIME DOMAIN MEASUREMENT AND CONTROL SYSTEM FOR A HOT WIRE AIR FLOW SENSOR

(75) Inventors: George Saikalis, West Bloomfield, MI (US); Shigeru Oho, Farmington Hills, MI (US); Marco diPierro, Karisruhe (DE)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/393,395

(22) Filed: Sep. 10, 1999

(51) Int. Cl.$^7$ ................................................ G01F 1/68
(52) U.S. Cl. .................... 73/204.14; 73/204.23
(58) Field of Search .................. 73/204.14, 204.23; 702/44, 45, 46, 47, 53, 78, 79, 100

(56) References Cited

U.S. PATENT DOCUMENTS

| | | | | |
|---|---|---|---|---|
| 4,680,964 A | * | 7/1987 | Sato et al. | 73/204 |
| 4,753,111 A | * | 6/1988 | Caron et al. | 73/204 |
| 4,872,339 A | * | 10/1989 | Gerhard et al. | 73/204.14 |
| 5,211,056 A | * | 5/1993 | Takamoto et al. | 73/118.2 |
| 5,417,110 A | | 5/1995 | Wood | 73/204.16 |
| 5,544,079 A | * | 8/1996 | Saikalis | 364/571.01 |

FOREIGN PATENT DOCUMENTS

| | | |
|---|---|---|
| DE | 2849467 | 5/1980 |
| DE | 3429729 | 7/1986 |
| EP | 0144027 | 6/1985 |
| EP | 0374352 | 6/1990 |
| JP | 54-126786 | 10/1979 |
| JP | 54-126789 | 10/1979 |
| JP | 8-129440 | 5/1996 |
| JP | 8-175084 | 7/1996 |

* cited by examiner

*Primary Examiner*—Benjamin R. Fuller
*Assistant Examiner*—Corey D. Mack
(74) *Attorney, Agent, or Firm*—Gifford, Krass, Groh, Sprinkle, Anderson & Citkowski, P.C.

(57) ABSTRACT

A time domain measurement and control system for a hot wire air flow sensor is disclosed in which the air flow sensor is of the type having a resistive heating element with an input end and an output end. The control system includes a fixed frequency variable width pulse generator which generates a pulse train through the heating element. This pulse train, furthermore, has a first predetermined voltage amplitude. The output voltage amplitude of the pulse train is determined at the outlet end of the heating element while a control circuit varies the duty cycle of the pulse train to maintain the output voltage amplitude at a second predetermined voltage level. The duty cycle of the pulse train is proportional to the air flow rate through the air flow sensor. In a modification of the invention, a fixed width variable frequency pulse train is generated through the resistive heating element and the frequency of the pulse train is varied to maintain the output voltage amplitude of the pulse train at the outlet end of the resistive heating element at a second predetermined voltage level. In this modification, the frequency of the pulse train is proportional to the air flow rate through the air flow sensor.

6 Claims, 2 Drawing Sheets

TIME DOMAIN MEASUREMENT AND CONTROL SYSTEM FOR A HOT WIRE AIR FLOW SENSOR

BACKGROUND OF THE INVENTION

I. Field of the Invention

The present invention relates to a time domain measurement and control system for a hot wire air flow sensor.

II. Description of the Prior Art

Many automotive engine systems utilize hot wire air flow sensors in order to determine the air flow rate into the engine. This air flow rate, in conjunction with other engine parameters, is then utilized by a fuel management system which regulates and controls the operation of the engine.

These previously known hot wire air flow sensors utilize a resistive element based upon a linear analog proportional feedback control signal. This control signal varies the current flow through the resistive element by an amount sufficient to maintain the temperature differential between the resistive element and ambient air at a predetermined constant, typically 200° C. The magnitude of the current flow through the resistive element is then proportional to the air flow through the air flow sensor.

These previously known analog control systems for hot wire air flow sensors, however, have not proven wholly satisfactory in operation. These previously known systems suffer from relatively slow response times and relatively high steady state error. Furthermore, the required warming time for the air flow sensor in many cases is unsatisfactory.

A still further disadvantage of these previously known analog control hot wire air flow sensors is that the control system for such air flow sensors required operational amplifiers, a Darlington pair transistor and other resistors and capacitors to provide the correct feedback gains and offsets for the air flow sensor. As such, these previously known control systems for hot wire air flow sensors were relatively expensive due to their multiplicity of components.

SUMMARY OF THE PRESENT INVENTION

The present invention provides a control system for a hot wire air flow sensor which overcomes all of the above-mentioned disadvantages of the previously known devices.

In brief, a preferred embodiment of the control system of the present invention comprises means for generating a fixed frequency but variable width pulse train through the heating element. This pulse train, furthermore, has a first predetermined voltage amplitude at the input end of the heating element for the hot wire sensor. Although any conventional means can be utilized for generating the pulse train, in the preferred embodiment of the invention, a microcontroller, preferably microprocessor based, is programmed to generate the fixed frequency, variable width pulse train at an outlet port on the microcontroller.

Means are then provided for determining the output voltage amplitude of the pulse train at the output end of the heating element for the air flow sensor. In the preferred embodiment of the invention, the pulse train at the output end of the heating element is coupled as an input signal to an analog/digital (A/D) converter on the microcontroller. The digitized output from the A/D converter is coupled as an input signal to the microcontroller which then varies the duty cycle of the pulse train by an amount sufficient to maintain the output voltage amplitude at the outlet end of the heating element at a second predetermined voltage level. By doing so, the temperature differential between the heating element and ambient air is maintained substantially constant, e.g. 200° C.

The duty cycle of the pulse train is thus proportional to the energy consumption of the hot wire heating element which, in turn, is proportional to, i.e. varies as a function of, the air flow through the air flow sensor. Consequently, the duty cycle of the pulse train is proportional to, i.e. varies as a function of, the air flow through the air flow sensor and forms an input signal to the engine management system for the vehicle. Furthermore, as used in this application the word proportional means to vary as a function of, but not necessarily linearly.

In a modification of the present invention, a second measurement pulse train having the same frequency but mutually independent of the first pulse train is generated through the heating element of the hot wire air flow sensor. The amplitude of the test pulse train, rather than the main pulse train, i.e. the pulse train which actually heats the resistive heating element, is then used to vary the duty cycle of the main pulse train so that the amplitude of the second pulse train at the outlet end of the resistive heating element is maintained substantially constant.

In a still further embodiment of the present invention, the microcontroller generates a fixed width but variable frequency pulse train through the heating element of the air flow sensor. As before, the amplitude of the pulse train is determined at the output end of the resistive heating element and the frequency of the pulse train is varied in order to maintain the amplitude of the pulse train at the output end of the heating element substantially constant. In this embodiment of the invention, the frequency of the pulse train is proportional to the air flow rate through the air flow sensor.

Any conventional means, such as a PID controller, can be utilized to vary either the pulse width or pulse frequency in order to maintain the amplitude of the pulse train at the output end of the heating element substantially constant.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
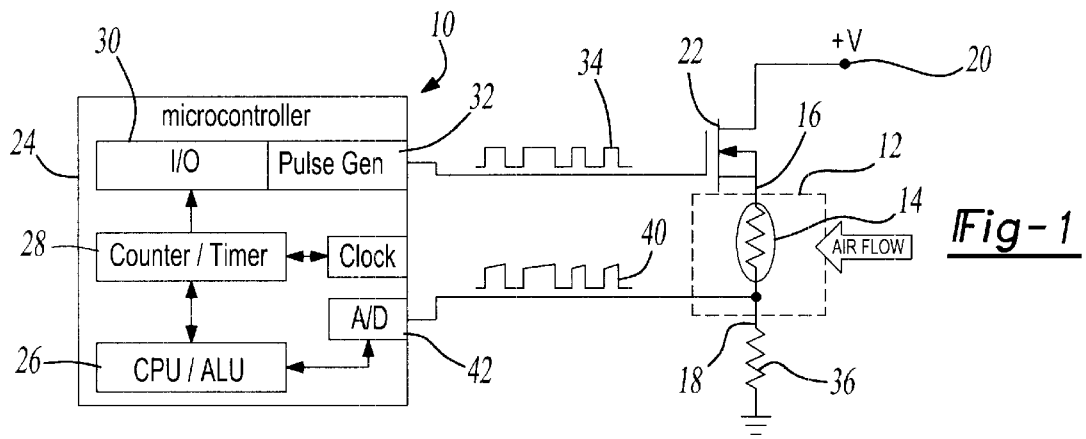
FIG. 1 is a block diagrammatic view illustrating a preferred embodiment of the present invention.

With reference first to FIG. 1, a block diagrammatic view of a first preferred embodiment of the time domain measurement and control system 10 for a hot wire air flow sensor 12 (illustrated only diagrammatically) is shown. In the conventional fashion, the air flow sensor 12 includes a resistive heating element 14 having an input end 16 and an output end 18. The input end 16 of the heating element 14 is connected to a voltage source 20 through an electronic switch 22, illustrated in FIG. 1 as a MOSFET, output end 18 is connected through a resistor 36 to ground. Thus, whenever the switch 22 is closed, current flows from the source 20 and through the resistive heating element 14 to ground.

In the conventional fashion, the temperature differential between the heating element 14 and ambient air is maintained at a predetermined constant, e.g. 200° C. Furthermore, the power consumption of the heating element 14 is proportional to the air flow across the heating element 14 since such air flow removes energy in the form of heat from the heating element 14.

Still referring to FIG. 1, the controller 10 preferably comprises a microcontroller 24 containing a CPU or other microprocessor 26. The microprocessor 26 has an output bus connected to a counter/timer 28 so that the microprocessor 26 periodically loads the counter/timer 28 with a value, such as an eight bit number. For example, assuming the counter/timer 28 is an eight bit register, the microprocessor 26 loads a value between 0 and 255 periodically, e.g. at a frequency rate of 1 kHz, into the counter/timer 28. Alternatively analog and/or digital circuitry can be used in lieu of the microprocessor or CPU.

The counter/timer 28 is then coupled through an input/output circuit 30 to a pulse generator 32. The pulse generator 32 has a fixed frequency, for example 1 kHz, but a variable duty cycle such that the output 34 from the pulse generator 32 is a pulse train having a constant amplitude and frequency, but variable pulse width.

Still referring to FIG. 1, the counter/timer 28 is preferably a down counter which is periodically loaded with a digital value by the CPU 26 at a frequency equal to the frequency of the pulse generator 32 which initiates the pulse by the pulse generator 32. The magnitude of the count loaded by the microprocessor 26 into the counter/timer 28 is proportional, and preferably directly proportional, to the width or duty cycle of the output pulse train 34. For example, assuming that the counter/timer 28 is an eight bit register, a higher value in the counter/timer 28 correlates to a greater pulse width and thus greater duty cycle of the pulse train 34, and vice versa. A clock 36 is preferably used to down count the count in the counter/timer 28 so that, when the count in the counter/timer 28 reaches zero, the pulse is terminated.

Still referring to FIG. 1, the pulse train 34 is coupled as an input signal to the electronic switch 22 so that, whenever the amplitude of the pulse train 34 is high, the electronic switch 22 is closed so that a current pulse corresponding in width to the pulse of the pulse train 34 conducts current from the voltage source 20 and through the heating element 14. Furthermore, since the resistance of the heating element 14 as well as any other resistors 36 in series with the heating element 14 are known, the amplitude or voltage of each input pulse at the input end 16 to the heating element 14 is constant.

Still referring to FIG. 1, a pulse train 40 at the output end 18 of the heating element 14 is coupled as an input signal through an analog/digital (A/D) converter 42 to the microprocessor 26. This pulse train 40 has a duty cycle identical to the duty cycle of the input pulse train 34 but with a smaller amplitude or voltage. It is the voltage of the pulse train 40 which is converted into a digital signal by the A/D converter 42 and coupled as an input signal to the microprocessor 26.

The instantaneous power and energy consumption of the heating element 14 is defined by the following equations:

$$P=IV$$
$$E=IVt \qquad (1)$$

where P=power
E=energy
I=current
V=voltage
t=time.

Consequently, in order to maintain the energy consumption by the heating element 14 constant, it is only necessary to maintain the voltage amplitude at the output 18 of the heating element 14 at a constant value, e.g. 1.95 volts. In order to maintain the voltage constant at the output 18, the duty cycle of the pulse train 34 or 40 is varied so that the duty cycle of the pulse train 34 or 40 (which are identical to each other) is proportional to the air flow rate through the air flow sensor 12.

Figure 2:
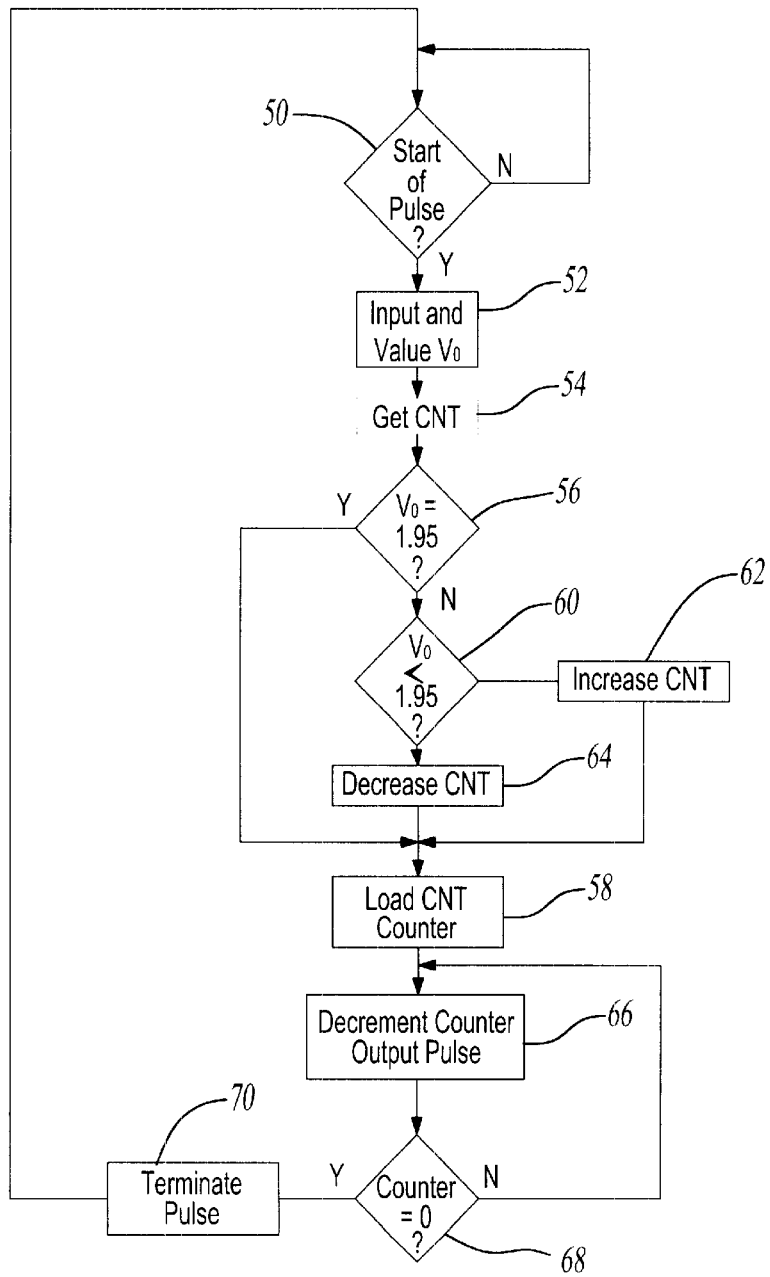
FIG. 2 is a flow chart illustrating an exemplary operation of the present invention.

With reference now to FIG. 2, a simplified flow chart illustrating an exemplary operation of the present invention is shown. At step 50 the program determines the start of each pulse which is at a fixed frequency, for example 1 kHz. At the beginning of each pulse, i.e. once every millisecond, step 50 branches to step 52.

At step 52, the microprocessor 26 inputs the digital value of the voltage $V_o$ at the output end 18 of the heating element 14 from the A/D converter 42 and then branches to step 54. At step 54, the program determines the value of the count CNT which, for an eight bit counter, will vary from 0 to 255. Step 54 then branches to step 56. At step 56, the microprocessor 26 determines if the voltage $V_o$ is equal to the desired target value, e.g. 1.95 volts. If so, step 56 branches to step 58 which loads the value CNT into the counter 28. Otherwise, step 56 branches to step 60.

At step 60, the program determines if the output voltage $V_o$ is less than 1.95. If so, step 60 branches to step 62 which increments or increases the count CNT and then branches to step 58. Otherwise, step 56 branches to step 64 in which the value of the count CNT is decreased or decremented and then branches to step 58.

As can be seen from the foregoing, the value of the count CNT increases whenever the output voltage $V_o$ is less than its target amount and, conversely, increases whenever the voltage Vo is greater than its target amount. The final value of the count CNT is then loaded into the counter 28. Step 58 then branches to step 66 which decrements the count in the counter 28 and then branches to step 68.

At step 68, the program determines if the count in the counter 28 has reached 0. If not, step 68 branches back to step 66 which continues the generation of the pulse and again decrements the counter and then again branches to step 68. Once the count in the counter reaches 0, step 68 branches to step 70 which terminates the output pulse and step 70 then branches to step 50 which forms a waiting loop until the next clock cycle, i.e. the generation of the next pulse.

The count CNT in the counter 28 is thus directly proportional to the duty cycle of the pulse train 34 and thus of the duty cycle of the current flow through the heating element 14. Thus, the duty cycle is directly proportional to the energy consumption by the heating element 14 which, in turn, is proportional to the air flow rate through the air flow sensor 12.

Although the flow chart illustrated in FIG. 2 to show simple increases and decreases in the count CNT in order to maintain the output voltage $V_o$ at its target value, in practice more complex routines, such as a PID transfer function, will be used to vary the value of the count CNT in order to achieve the target value of the output voltage $V_o$. Such more complex routines will provide faster response times and accuracy in the well known fashion.

With reference again to FIG. 1, the precise resistance of the heating element 14 varies slightly in dependence upon its instantaneous current flow. Thus, even if an ideal square wave pulse were provided as the pulse train input 34 to the switch 22, the output pulse train 40 from the output end 18 of the heating element 14 will not precisely match the wave form of the input train 34. Instead, the output train 40 may be slightly trapezoidal and may also include transient values at both its initiation and termination. For that reason, in the preferred embodiment of the invention, the acquisition of the voltage $V_o$ by the A/D converter 42 is timed such that the acquisition occurs substantially in the center of each pulse in the output pulse train 40.

Figure 3:
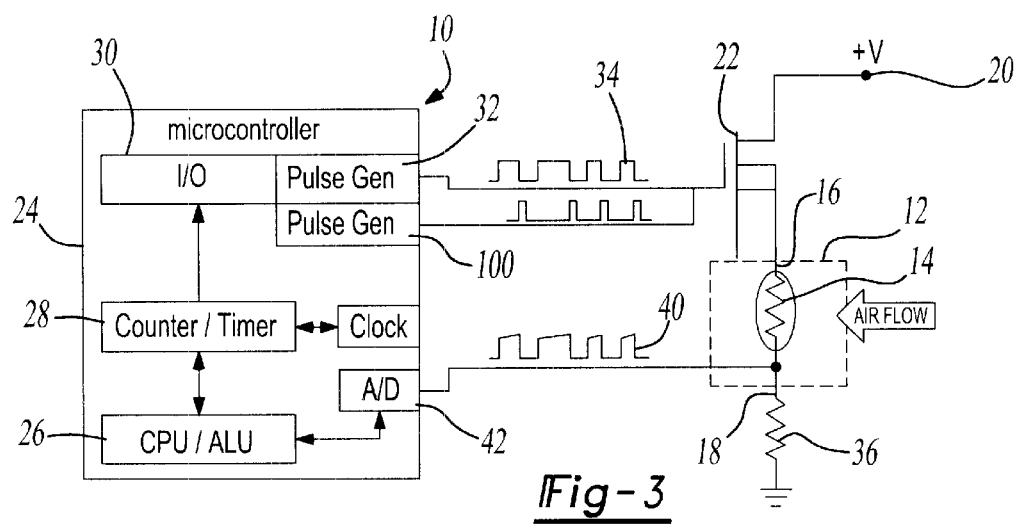
FIG. 3 is a view similar to FIG. 1, but illustrating a modification thereof.

With reference now to FIG. 3, a modification to the present invention is there shown which is similar to FIG. 1 except that the controller 10 includes a second pulse generator 100 which generates a second pulse train 102 at the same frequency, but mutually exclusive, to the main pulse train 34. Furthermore, the second pulse train 102 generated by the pulse generator 100 is mutually independent of the main pulse train 34 and so that one pulse in the pulse train 102 immediately follows each pulse in the main pulse train 34 to form the combination wave form illustrated in FIG. 4. The pulse train 102, furthermore, is very short in its time duration relative to the main pulse train 34.

Figure 4:
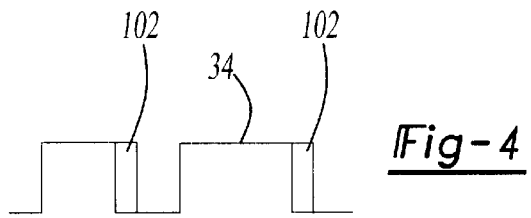
FIG. 4 is a wave form of the embodiment of the invention illustrated in FIG. 3.

Still referring to FIGS. 3 and 4, the data acquisition by the microprocessor 26 from the A/D converter 42 is timed so that the acquisition occurs in the center of each pulse in the second pulse train 102. Thus, the main pulse 34 provides the heating current for the heating element 14 while the pulse 102 from the pulse generator 100 forms the measurement pulse for the controller 10. A primary advantage of determining the voltage $V_o$, at the output 18 of the heating element 14 during the second pulse train 102 is that transients occurring during the main or heating pulse train 34 have subsided and, furthermore, the heating element 14 is at its full steady state operational temperature. As such, the embodiment of the invention illustrated in FIGS. 3 and 4 may be capable of achieving higher accuracy than the embodiment illustrated in FIGS. 1 and 2.

Figure 5A:
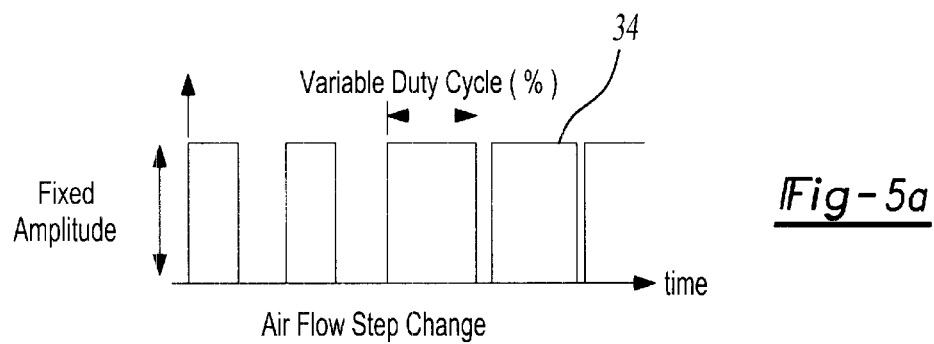
FIGS. 5a and 5b are wave forms illustrating two different embodiments of the present invention.
Figure 5B:
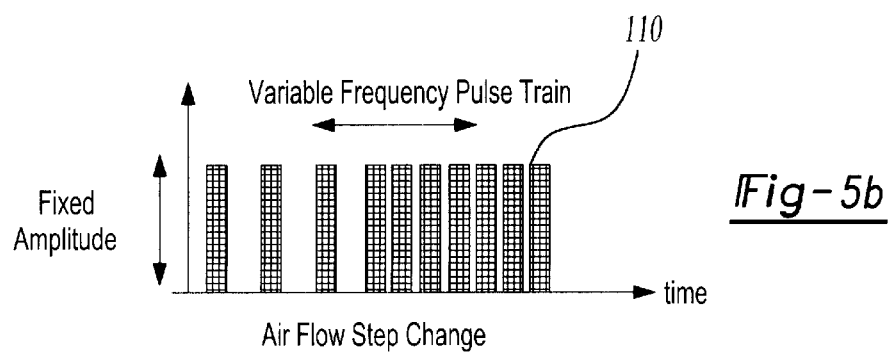

With reference now to FIG. 5a, a wave form showing the variable duty cycle pulse train 34 is there shown by way of example. As a further modification of the present invention, however, a fixed pulse width but variable frequency pulse train 110 such as shown in FIG. 5b may alternatively be utilized. If a fixed pulse width but variable frequency control such as shown in FIG. 5b is utilized, the frequency of the pulse train 110 is increased or decreased appropriately by the control circuit 10 to maintain the output voltage $V_o$ at the output end 18 of the heating element 14 at its target value. In this case, the frequency of the pulse train 110 is proportional to the air flow rate through the air flow sensor 12.

Although the present invention has been described as utilizing a microprocessor 26 to vary either the pulse width or pulse frequency in order to maintain the energy consumption of the heating element 14 substantially constant, other control means may alternatively be used. For example, the control circuit 10 could be hard wired, formed from PLAs or the like.

A primary advantage of the control system for the hot wire air flow sensor of the present invention is that more accurate control and air flow readings from the air flow sensor can be obtained as opposed to the previously known analog feedback systems. Furthermore, the present invention achieves not only higher accuracy, but faster response time than the previously known analog control circuits and does so with fewer and potentially less expensive components.

Having described our invention, however, many modifications thereto will become apparent to those skilled in the art to which it pertains without deviation from the spirit of the invention as defined by the scope of the appended claims.

We claim:

1. A control system for a hot element air flow sensor of the type having a resistive heating element with an input end and an output end, said control system comprising:

means for generating a first fixed frequency pulse train through the heating element, said first pulse train having a first predetermined voltage amplitude at the input end of the heating element, means for generating a second fixed frequency pulse train through the heating element, said second pulse train having a first predetermined voltage amplitude at the input end of the heating element, said second pulse train having the same frequency as said first pulse train but mutually independent of said first pulse train, means for determining an output voltage amplitude of said second pulse train at the output end of the heating element, and means for varying the duty cycle of said first pulse train to maintain said output voltage amplitude at a second predetermined voltage level, whereby the duty cycle of said first pulse train is proportional to the air flow rate through the air flow sensor.

2. The invention as defined in claim 1 wherein said determining means comprises an analog/digital converter.

3. The invention as defined in claim 1 wherein said varying means comprises a microprocessor.

4. The invention as defined in claim 1 generating means comprises a variable width pulse generator.

5. The invention as defined in claim 1 wherein said determining means comprises means for determining the output voltage amplitude of the pulse train at the output end of the heating element at a preselected portion of each pulse in the pulse train.

6. The invention as defined in claim 1 wherein said varying means comprises a PID controller.

* * * * *